(12) United States Patent
Boye (10) Patent No.: US 7,104,530 B2
(45) Date of Patent: Sep. 12, 2006

(54) DEVICE AND A METHOD FOR CONTACTING A LIQUID WITH A GAS

(75) Inventor: Bo Boye, Birkeroed (DK)

(73) Assignee: Fibra Limited, Berkshire (GB)

( * ) Notice: Subject to any disclaimer, the term of this patent is extended or adjusted under 35 U.S.C. 154(b) by 0 days.

(21) Appl. No.: 10/489,785

(22) PCT Filed: May 3, 2002

(86) PCT No.: PCT/DK02/00288

§ 371 (c)(1),
(2), (4) Date: Mar. 17, 2004

(87) PCT Pub. No.: WO03/024582

PCT Pub. Date: Mar. 27, 2003

(65) Prior Publication Data

US 2004/0262789 A1    Dec. 30, 2004

(30) Foreign Application Priority Data

Sep. 17, 2001   (DK) ................................ 2001 01349

(51) Int. Cl.
*B01F 3/04* (2006.01)
(52) U.S. Cl. ....................... 261/94; 261/95; 96/8; 96/10
(58) Field of Classification Search .................. 261/94, 261/95, 97, 99, 104; 96/8, 10
See application file for complete search history.

(56) References Cited

U.S. PATENT DOCUMENTS

| | | | | |
|---|---|---|---|---|
| 1,755,011 A | * | 4/1930 | Ludlam ........................ 96/243 |
| 3,748,828 A | | 7/1973 | Lefebvre |
| 4,155,961 A | * | 5/1979 | Benthin ....................... 261/104 |
| 4,219,420 A | | 8/1980 | Müller |
| 4,376,095 A | * | 3/1983 | Hasegawa ..................... 422/46 |
| 4,618,462 A | * | 10/1986 | Fisher ......................... 261/130 |
| 4,636,307 A | * | 1/1987 | Inoue et al. ................. 210/188 |
| 4,750,918 A | * | 6/1988 | Sirkar ........................... 95/44 |
| 4,793,932 A | * | 12/1988 | Ford et al. ................... 210/636 |
| 4,851,136 A | * | 7/1989 | Fanqing et al. ............. 210/798 |
| 4,917,797 A | | 4/1990 | Inacio et al. |
| 4,961,464 A | | 10/1990 | Wollbeck et al. |
| 4,980,098 A | | 12/1990 | Connery |
| 5,006,264 A | * | 4/1991 | Acuna ......................... 210/741 |
| 5,116,308 A | * | 5/1992 | Hagiwara .................. 604/6.15 |
| 5,405,497 A | | 4/1995 | Torregrossa |
| 5,470,470 A | * | 11/1995 | Leyat ......................... 210/350 |
| 6,004,386 A | | 12/1999 | Grisham et al. |

FOREIGN PATENT DOCUMENTS

| | | |
|---|---|---|
| EP | 0 280 052 | 8/1988 |
| WO | WO94/11088 | 5/1994 |
| WO | WO02/24306 | 3/2002 |

\* cited by examiner

*Primary Examiner*—Scott Bushey
(74) *Attorney, Agent, or Firm*—Pillsbury Winthrop Shaw Pittman, LLP (57) ABSTRACT

A device or apparatus for contacting a liquid with a gas is provided. The device or apparatus has at least one gas inlet for introducing the gas into the liquid and a fiber housing with at least one liquid inlet and at least one liquid outlet. The fiber housing is surrounding and defining an outer bound for a plurality of fibers extending longitudinally in the fiber housing, whereby longitudinally extending interspaces are provided between the fibers. These interspaces thereby define flow passages for the liquid and gas. There is also provided a system and a method for contacting a liquid with a gas.

32 Claims, 4 Drawing Sheets

DEVICE AND A METHOD FOR CONTACTING A LIQUID WITH A GAS

CROSS REFERENCE TO RELATED APPLICATION

This is the U.S. National Stage of PCT/DK02/00288, filed May 3, 2002, which in turn claims priority to Denmark Patent Application No. PA 2001 01349, filed Sep. 17, 2001, both of which are incorporated herein in their entirety by reference.

FIELD OF THE INVENTION

The present invention relates to a device and a method for contacting a liquid with a gas for interfacial interaction. More particularly the present invention concerns a device and a method for contacting a liquid with a gas wherein a plurality of fibres extend longitudinally in a fibre housing with longitudinally extending interspaces being provided between the fibres and defining flow passages for the liquid and the gas.

BACKGROUND OF THE INVENTION

There are many processes in industry in which it is desirable to "react" (chemically or physically) a liquid with a gas. Most of such processes may differ significantly in detail, but many processes have in common the desire to provide intimate contact between the gas and the liquid and at a rapid rate. A rapid intimate contact may result in effective reactions and a fast reaction rate, both being desirable goals.

U.S. Pat. No. 6,004,386 discloses an apparatus for generating gas-liquid interfacial contact conditions for highly efficient mass transfer between a gas and a liquid. The disclosed apparatus includes a gas-liquid contactor assembly including: a hollow porous tube surrounded by an outer jacket defining a gas plenum between the jacket and the porous tube; a liquid feed assembly including a nozzle for injecting liquid into the porous tube in a spiralling flow pattern around and along the porous tube; a gas-liquid separator assembly at the first end of the porous tube including a non-porous degassing tube coaxially aligned with and connected to the porous tube, a gas outlet port coaxially aligned with the degassing tube to receive a first portion of gas flowing from the degassing tube, a first gas duct coaxially aligned with and connected to the gas outlet duct to convey the first portion of gas therefrom; and a liquid collection assembly. A second gas discharge assembly to collect and convey gas from the first end of the porous tube is also disclosed.

In U.S. Pat. No. 5,405,497 is disclosed a method of chemically reacting a liquid with a gas in a vortex. Here, a slurry or a liquid is introduced in a first end of a vortex, and a gas is introduced from exteriorly of the vortex into contact with the slurry or liquid in the vortex, so that a reaction between the slurry or liquid and the gas takes place. The treated slurry or liquid is removed from the second end of the vortex while any residual or carrier gas is removed from the first end of the vortex. Gas introduction may be accomplished through a porous surface of revolution (e.g. cylindrical or conical) wall surrounding the vortex, whereby the gas may be in minute bubble form when it enters the slurry or liquid.

However, neither from U.S. Pat. No. 6,004,386 or from U.S. Pat. No. 6,004,386 is it known to obtain an intimate contact between a gas and a liquid by the use of flow passages obtained from longitudinally extending interspaces of fibres extending longitudinally in a fibre housing.

The use of fibres extending longitudinally in the direction of a fluid flow and used for filtration of such fluid has been described in the prior art. U.S. Pat. No. 4,219,420 discloses an arrangement for filtering a contaminated fluid or medium. According to the disclosure of this patent a plurality of fibre bundles are located on a support and extend within a filter housing in direction between an inlet and an outlet of the housing. The fluid to be filtered is introduced through the inlet in a direction towards the outlet. The contaminated particles become arrested among the fibres as it passes through the plurality of fibre bundles. In order to improve the "depth effect" of the fibre bundles, the fibres may have different lengths. Here the quality of the filtered fluid depends on the density of the fibre bundles. However, in order to increase the quality of the filtration process, the density of the fibres must be increased, which requires more fibre bundles to be inserted into the filter housing.

An improvement to the filter of U.S. Pat. No. 4,219,420 has been proposed in EP 0 280 052. Here a filter housing comprises a supporting means with a plurality of fibre bundles attached to the supporting means and extending within the filter housing in direction between an inlet and an outlet. A flexible water-proof membrane is provided within the filter housing to constitute a pressure chamber. When pressurised during the filtration process, the membrane press the plurality of fibre bundles to form a frustrum-like filter chamber, and the fluid becomes filtered as it passes through the frustrum-like chamber. Here the density of the fibres and thus the quality of the filtration can be controlled by adjusting the pressure in the pressure chamber whereby the compressing of the fibres is adjusted.

Another filter having fibres extending longitudinally in the direction of the fluid flow, and wherein the density of the fibres is adjusted by compressing the fibres, is disclosed in WO 94/11088. Here the fibres are arranged within an opening defined by a retaining member, and a displacement member comprising a conical-shaped part is arranged in the centre of the fibres. By moving the displacement member in a direction along the fibres, the compressing of the fibres against the retaining member is adjusted whereby the density of the fibres and the quality of the filtration is controlled.

Thus, the principles of having a fluid filtration wherein a plurality of fibres extend longitudinally in the direction of the fluid flow, and wherein the quality of the filtration is controlled by adjusting the compression and thereby the density of the fibres is known.

The filtering device of U.S. Pat. No. 4,219,420 uses a pressure chamber in order to compress the fibres, whereas the filtering device of WO 94/11088 has a conical-shaped displacement member arranged in the centre of the fibres in order to compress the fibres against a retaining member. Both of these filtering devices are relatively expensive to produce.

However, in none of the above mentioned references describing filtering devices using fibres extending in the direction of the fluid flow has it been suggested to obtain an intimate contact between a gas and a liquid by the use of the flow passages formed between the fibres.

Thus, there remains a substantial need for an improved method of optimising gas-liquid interfacial contact, and a need for an improved device in which optimal conditions for gas-liquid interfacial contact can be economically created and controlled.

SUMMARY OF THE INVENTION

According to a first aspect of the present invention, there is provided a device for contacting a liquid with a gas, said device comprising:
 at least one gas inlet for introducing the gas into the liquid, and
 a fibre housing having at least one liquid inlet and at least one liquid outlet, said fibre housing surrounding and defining an outer bound for a plurality of fibres extending longitudinally in the fibre housing, longitudinally extending interspaces being provided between the fibres thereby defining a plurality of flow passages for the liquid and gas.

It is preferred that the at least one liquid inlet is arranged in an inlet end of the fibre housing. It is also preferred that the at least one liquid outlet is arranged in an outlet end of the fibre housing. Here, the longitudinally extending interspaces between the fibres may be at least partly extending in a direction from the inlet end to the outlet end of the fibre housing. In a preferred embodiment, at least part of the gas inlet(s) are arranged so that at least part of the gas can be introduced into the liquid at the inlet end of the fibre housing or before the liquid enters the inlet end of the fibre housing via said liquid inlet(s), whereby a flow of gas and liquid can be obtained from the inlet end to the outlet end via the flow passages provided by said interspaces, said interspaces thereby providing a contact between the liquid and the gas.

According to an embodiment of the invention, the device may further comprise at least one gas outlet, and the at least one gas outlet may be part of or connected to the fibre housing. It is also within an embodiment of the invention that the device may further comprise a gas-liquid separator. Here, the gas-liquid separator may be connected to the at least one gas outlet.

According to an embodiment of the present invention, the plurality of fibres may be closely packed at at least one location along the length of the fibres within said fibre housing. It is also within an embodiment of the invention that the plurality of fibres may be closely packed in a radial direction at at least one location along the length of the fibres within said fibre housing.

In a preferred embodiment, at least part of said fibre housing is formed of a flexible membrane surrounding the fibres, and compressing means is provided for creating a pressure on an outer surface of the flexible membrane thereby compressing the fibres in a radial direction at at least one location along the length of the fibres to thereby obtain a close packing of the fibres.

The fibre housing may have different forms, but it is preferred that the fibre housing has the form of a tube-like member. It is also preferred that at least part of said fibre housing has a cross sectional geometric shape which is substantially equal to a shape selected from the group comprising: a circle, an oval, an ellipse, the shape of a drop, and a polygon. Here, said polygon shape may be selected from the group comprising: a triangle, a rectangle, a pentagon, a hexagon, a heptagon, and an octagon.

According to a preferred embodiment of the invention, the compressing means may be adapted to create said pressure on a part or a portion of said outer surface of the flexible membrane, said part or portion having a dimension or dimensions in the longitudinally direction of the fibres being smaller than the total length of the fibres within said fibre housing. Here, the dimension of said pressure part or portion in the longitudinally direction of the fibres may be below 0.5 times the total length of the fibres within said fibre housing, such as below 0.4 times, such as below 0.2 times, or such as below 0.1 times.

In a preferred embodiment of the invention, said compressing means is a pressure chamber, wherein an inner wall of said pressure chamber may be formed of at lest part of the flexible membrane of the fibre housing. The pressure chamber may have one or more inlet/outlets providing a pressurizing aperture and a release aperture.

It is within a preferred embodiment that the compressing means is adapted to create said pressure on a part or a portion of said outer surface of the flexible membrane, said part or portion at least partly covering an outer circumference of said membrane or covering the hole circumference of said membrane. Here, the pressure part or portion may preferably be partly covering an outer circumference of said membrane, such as covering below 90% of an outer circumference of said membrane, such as below 80%, such as below 70%, such as below 60%, such as below 50%, such as below 40%, such as below 30%, or such as below 20%.

The present invention also covers embodiments in which a pressure may be created on the outer surface of the flexible membrane through one or more substantially solid compressing member(s) being in contact with said outer surface.

According to an alternative embodiment of the invention, the fibre housing may be formed by a solid retainer member surrounding the fibres, and compressing means may be provided in the form of a compressing member being disposed inside the plurality of fibres in the retainer member for compressing the fibres in a radial direction at at least one location along the length of the fibres to thereby obtain a close packing of the fibres. Here, the retaining member may be a retaining ferrule, and the compressing member may be a displacement member comprising a conical shaped part being arranged at the centre of the fibres.

When the fibres are compressed it is preferred that the location at which the fibres are compressed is a predetermined location. It is also preferred that the means for compressing is adapted to vary the pressure created thereby, so as to thereby vary the close packing of the fibres and the total cross-section of the flow passages at said location.

It should be understood that according to the present invention, different means may be used for compressing the fibres. Thus, it is within an embodiment of the invention that the compressing means comprises a clamp. It is also within an embodiment of the invention that the compressing means comprises at least two blocks being positioned on opposite sides of the flexible membrane, so as to compress the fibres from two sides.

In a preferred embodiment, the compressing means comprises hydraulic means for creating a pressure.

When compressing the fibres according to the present invention, it is preferred that the compressing means is adapted to compress the plurality of fibres in a radial direction with a pressure of between 5–20 bar.

The present invention also covers embodiments in which the fibre housing is formed of a flexible membrane in substantially all its length.

When having a fibre housing with at least part of said fibre housing being formed of a flexible membrane, it is preferred that the fibre housing or at least part of the fibre housing is made of a material selected from a group comprising: PE (polyethylene), softened PVC, nylon, Teflon, and EPDM-rubber.

It should be understood that different materials may be used for the fibre housing, but it is preferred that the fibre housing is made of a watertight material.

In accordance with embodiments of the present invention, the fibre housing may be arranged within a holding member. Here, the holding member may be made of a substantially solid material, such as for example stainless steel. For fibre housing wherein at least part of the housing is made of a flexible membrane, the holding member may have one or more openings for allowing the compressing means to create a pressure on the outer surface of said flexible membrane of the fibre housing. According to an embodiment of the invention the holding member may have two openings for allowing the compressing means to create a pressure on the outer surface of said flexible membrane. It is preferred that the holding member is formed as a tube-like member. It is also preferred that the holding member has an inlet being sealingly connected to the liquid inlet of the fibre housing, and an outlet end being sealingly connected to the liquid outlet of the fibre housing.

It should be understood that different lengths of the distance from the inlet end to the outlet end of the fibre housing may be used. However, it will be most convenient to use a length defined by the length of commercially available fibres or bundles of fibres. Thus, the distance between the at least one liquid inlet and the at least one liquid outlet may be between 10 cm and 200 cm, such as between 30 cm and 150 cm, such as between 40 and 80 cm. If a bundle of fibres having a length of about 60 cm is used, a preferred distance between the at least one inlet and the at least one outlet may be between 50 and 70 cm, or about 60 cm. The present invention also covers embodiments wherein the distance between at least one liquid inlet and at least one liquid outlet is between 10 cm and 60 cm, such as between 20 cm and 40 cm, such as around 30 cm.

The distance between the at least one inlet and the location of close packing may be selected accordingly. Thus, the distance between at least one liquid inlet and said location of close packing may be between 5 cm and 100 cm, such as between 10 cm and 90 cm, such as between 20 and 80 cm, such as between 30 and 50 cm, such as around 40 cm. The invention also covers embodiments wherein the distance between at least one liquid inlet and said location of close packing is between 5 cm and 80 cm, such as between 10 cm and 60 cm, such as between 15 and 30 cm, such as around 20 cm.

The present invention covers embodiments with different internal diameters of the fibre housing. However, it will be most convenient to select a diameter, which will fit to the diameter of commercially available bundle of fibres. Thus, the internal diameter of the fibre housing may for example be between 1 cm and 20 cm, such as between 2 cm and 15 cm, such as between 3 cm and 10 cm, such as between 4 cm and 8 cm, such as around 5 cm. For some purposes, which are also covered by the present invention, it may be convenient that the contacting device of the invention comprises means for maintaining a longitudinal tension in the fibres.

Different types of fibres may be used for the contacting device, where the types of fibres may be selected in order to fulfil the requirements of a given contacting and/or filtration process. Thus, the fibres may be porous or non-porous, the fibres may be solid or hollow, and the fibres may comprise transparent fibres. When using hollow fibres, it is preferred that the hollow fibres are closed at fibre ends arranged in the same end of the fibre housing as a liquid inlet to the fibre housing. Different materials may be used for the fibres, such as polyester or nylon, but other materials such as glass materials or stone materials may be used for the fibres.

The cross-sectional dimension of the fibres may vary according to the process. Thus, the fibres may have a substantially circular cross-section with a diameter of at most 5 mm, such as at most 2 mm, such as in the range of 0.001–1 mm, such as in the range of 0.01–0.5 mm. It is also within embodiments of the present invention that the fibres have a substantially circular cross-section with a diameter of at most 250 mm, such as at most 160 mm, such as at most 60 mm, such as at most 25 mm, such as at most 16 mm, such as at most 6 mm, such as at most 2,5 mm.

Here it should be understood that dimensions of the fibres and the compression of the fibres may be selected so that the cross-sectional dimension of the formed interspaces have a size, which will generate bubbles or micro-bubbles of a desired diameter, when the liquid and gas flow through the flow passages provided by said interspaces.

When arranging the fibres in the fibre housing, it is preferred that the fibres at the inlet end of the fibre housing are attached to an end part of the fibre housing. Here, the fibres at the inlet end of the fibre housing may be glued to the end part or glued to a holding member, which is arranged at the end part. The fibres may be glued by means of epoxy. In a preferred embodiment, the fibres have free fibre ends at the opposite end of the inlet end of the fibre housing. However, the present invention also covers an embodiment in which the fibres, in their respective ends, are attached to an end part of the fibre housing. Also here, the fibres may be glued to the end parts or to holding members arranged at the end parts by means of epoxy.

The fibres may be arranged within the fibre housing as a bundle of fibres having the length of the fibres. However, fibres may also be arranged as a bent bundle of fibres so that a resulting length of the bent bundle of fibres is approximately between ⅓ and ⅔ of the length of the non-bent fibres. Preferably, the length of the bent bundle of fibres may be about half the length of the non-bent bundle of fibres. The bent end part of the bent bundle of fibres may be arranged in either the inlet end or the outlet end of the fibre housing.

Although it may be preferred that the compressing means is adapted to compress the fibres at a single location along the length of the fibres, it is also within the present invention that the compression means is adapted to compress the fibres at several locations along the length of the fibres. Here, the pressure may vary for the different locations of the compressed fibres.

It should be understood that the compression means may be realised in different ways within the scope of the present invention. Thus, the compressing means may comprise one or more compressing members, which may have non-flexible and/or flexible parts.

The embodiments of the device according to the first aspect of the invention may be used for contacting a gas with a liquid and/or for filtering when arranged in a contacting and/or filtering system. Thus, according to a second aspect of the invention, there is provided a system for contacting a liquid with a gas and/or for filtering a fluid, said system comprising: a contacting device selected from the devices according to the first aspect of the invention, and means for passing a liquid and a gas through the plurality of flow passages of the fibres. The system may further comprise means for maintaining the fibres in a compressed condition while passing the liquid and the gas through the flow passages of the compressed fibres.

The system may further comprise means for releasing the pressure on the outer surface of the flexible membrane thereby leaving the fibres in an uncompressed condition, and means for passing a liquid and/or a gas through the uncompressed fibres in a direction from the inlet towards the outlet or in an opposite direction, so as to forward flush or backward flush the device. Here, the liquid to be passed through the uncompressed fibres so as to flush the fibres may be liquid, which has not been in contact with the gas. However, the liquid to be passed through the uncompressed fibres so as to flush the fibres may also or alternatively be treated liquid, which has been in contact with the gas.

In a preferred embodiment of the system of the second aspect of the invention, the means for compressing the fibres, the means for releasing the pressure, the means for passing a liquid and a gas through the compressed fibres for contacting the liquid with the gas, and the means for passing a liquid and/or a gas through the uncompressed fibres so as to flush the device are computer controlled.

It is also within the scope of the present invention to provide a method for contacting a liquid with a gas. Thus, according to a third aspect of the present invention, there is provided a method for contacting a liquid with a gas in a fibre housing having an inlet end and an outlet end, said fibre housing surrounding and defining an outer bound for a plurality of fibres extending longitudinally in the fibre housing, longitudinally extending interspaces being provided between the fibres thereby defining a plurality of flow passages between the inlet end and the outlet end, said method comprising:

introducing a liquid and a gas at the inlet end of the fibre housing, and passing the liquid and the gas from the inlet end to the outlet end via said flow passages provided by the interspaces.

It is preferred that the longitudinally extending interspaces between the fibres are at least partly extending in a direction from the inlet end to the outlet end of the fibre housing.

For the method of the third aspect of the invention it is preferred that the method further comprises removing the liquid from the outlet end of the fibre housing. Here, the liquid may be removed from the outlet end via one or more liquid outlets. It is also within an embodiment of the invention that the gas may be removed from the outlet end of the fibre housing.

In order to pass the liquid and the gas from the inlet end to the outlet end, a liquid pressure and a gas pressure may be provided at the inlet end to thereby obtain a flow of the liquid and the gas from the inlet end to the outlet end via said flow passages. The liquid and the gas may be introduced separately at the inlet end, or the liquid and the gas may be mixed before being introduced at the inlet end of the fibre housing. It is preferred that the liquid-air mixture is provided at the inlet end of the fibre housing with a pressure in the range of 2–7 bar, such as 3 bar, such as about 4 bar, such as about 5 bar, or such as about 6 bar.

When the gas and the liquid are introduced separately at the inlet end of the fibre housing, it is preferred that the gas is introduced at the inlet end via one or more gas inlets, and it is also preferred that the liquid is introduced at the inlet end via one or more liquid inlets. Thus, the liquid and the gas may be introduced to the fibre housing via at least one separate gas inlet and at least one separate liquid inlet. Here, a liquid pressure in the range of 2–7 bar, such as about 3 bar, such as about 4 bar, such as bout 5 bar, or such as about 6 bar may be provided at the inlet end of the fibre housing. It is also preferred that the gas is introduced at the inlet end of the fibre housing with a gas pressure being higher than a liquid pressure at which the liquid is introduced at the inlet end of the fibre housing. Here, the gas pressure at the inlet end may be about 0.5–2 bar higher than the liquid pressure at the inlet end of the fibre housing.

The method of the third aspect of the invention also covers embodiments in which the plurality of fibres are closely packed in a radial direction at at least one location along the length of the fibres within said fibre housing. Thus, the method may further comprise the steps of compressing the fibres in a radial direction at a location along the length of the fibres, so as to reduce the cross-sectional area of the flow-passages, and maintaining the pressure on the fibres while passing the liquid and the gas to be contacted through said flow passages. In order to compress the fibres, it is preferred that at least part of the fibre housing is formed of a flexible membrane surrounding the fibres. So, the step of compressing the fibres may comprise creating a pressure on at least part of an outer surface of the flexible membrane surrounding the fibres.

Some processes may benefit from the use of ultraviolet light. Thus, it is also within the third aspect of the invention that the method further comprises the use of ultraviolet light. Here, the fibres may be optical fibres and the ultraviolet light may be transmitted through said fibres.

When contacting a gas with a liquid according to the third aspect of the invention, micro-bubbles containing the introduced gas may be generated within the liquid when the liquid and the gas is passed through the flow passages of the fibres, and the dimension of said micro-bubbles may be a function of the diameter or cross-sectional dimensions of the fibres and/or the cross-sectional dimension of the flow passages provided by the interspaces. So, for a given diameter or cross-sectional dimension of the fibres, the cross-sectional dimension of the flow passages may be controlled by the close packing of the fibres, and the close packing of the fibres may be controlled by the compression of the fibres in the radial direction. According to an embodiment, the diameter of the fibres and the dimension of the flow passages may be selected so that the generated micro-bubbles have a cross-sectional dimension, which is at most 1 mm, such as in the range of 0.1–1 mm, such as in the range of 0.2–0.6 mm, such as about 0.4 mm.

The third aspect of the invention also covers embodiments in which the diameter of the fibres and/or the dimension of the flow passages may be selected so that the introduced gas via the generated micro-bubbles are absorbed or at least partly absorbed into the introduced liquid.

It should be understood that for different gas-liquid contacting processes, different gasses may be introduced for contacting the liquid. Thus, for some processes the introduced gas may be air, while for other processed the introduced gas may be ozone.

It is also within an embodiment of the third aspect of the invention that the introduced gas is an oxygen containing gas, while in another embodiment the introduced gas may be selected from the group consisting essentially of chlorine and chlorine dioxide.

The fibre housing may be arranged in different orientations, but in a preferred embodiment of the method of the invention, the fibre housing is vertically arranged with the inlet end of the fibre housing at the bottom and the outlet end at the top.

When the fibres are closely packed at at least one location, the method of the third aspect of the invention may further comprise a filtration process in which the liquid is filtered when passing through said flow passages and the filtration process is controlled by said close packing or compressing of the fibres.

For embodiments of the method of the invention in which the fibres are closely packed at at least one location, the method may further comprise the steps of: releasing the pressure on the fibres and passing a liquid or a gas through the uncompressed fibres. Here, the liquid or gas may pass the uncompressed fibres in a direction from the inlet towards the outlet or in an opposite direction, so as to forward flush or backward flush the device. The liquid to be passed through the uncompressed fibres so as to flush the fibres may be liquid, which has not been in contact with the gas, or it may be treated liquid, which has been in contact with the gas.

It should be understood that the methods according to the third aspect of the invention may be performed by use of a device or a system selected from the devices and systems according to the first and second aspects of the present invention.

Other objects, features and advantages of the present invention will be more readily apparent from the detailed description of the preferred embodiments set forth below, taken in conjunction wit the accompanying drawings.

DETAILED DESCRIPTION OF PREFERRED EMBODIMENTS

Figure 1:
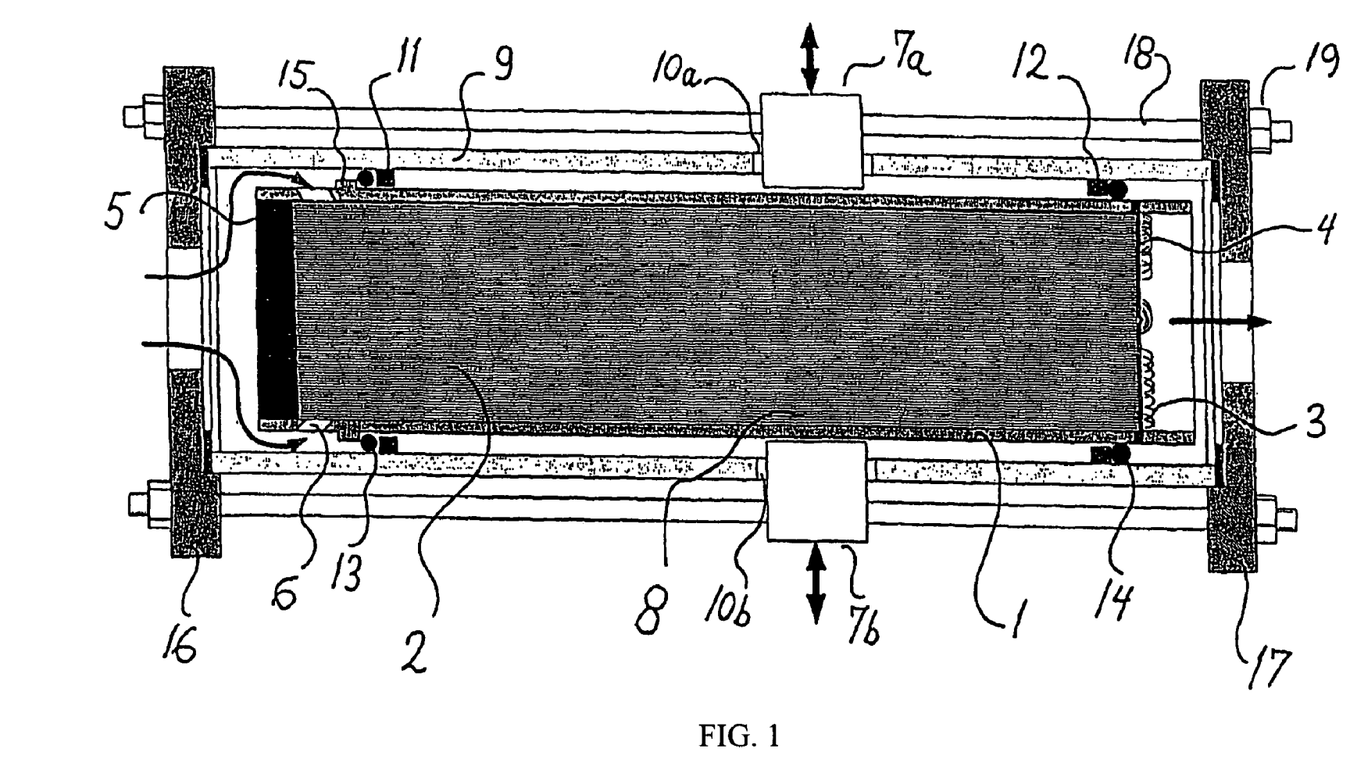
FIG. 1 is a longitudinal section view of a first embodiment of a device used for contacting a liquid with a gas in accordance with the present invention.

In FIG. 1 is shown a longitudinal section view of an embodiment of device, which may be used for contacting a liquid with a gas according to the present invention. The device of FIG. 1 comprises a fibre housing 1 having the form of a tube. Here, the fibre housing 1 is made of a flexible, watertight material in all the housing length, whereby the fibre housing is formed as a flexible membrane surrounding a bundle of fibres 2. The bundle of fibres 2 comprises a plurality of fibres extending longitudinally in the fibre housing 1.

In the illustrated embodiment the fibres are bent to thereby obtain a bundle of bent or folded fibres 2 having a length being about half the length of the non-bent fibres. The bent end of the fibres is arranged in an outlet end 3 of the fibre housing 1. Here the fibres may be bent around a cross 4 secured to the fibre housing 1 by gluing by means of epoxy. The free ends of the fibres are arranged in an inlet end 5 of the fibre housing 1. Here, it is preferred that the fibres are glued to the inlet end 5 by means of epoxy resulting in a watertight end surface at the inlet end 5. The bundle of fibres 2 should be substantially equally spaced when arranged in the epoxy of the inlet end 5 in order to obtain a number of substantially equally sized interspaces defining flow passages. A number of liquid or fluid inlets 6 are arranged in the sidewall of the fibre housing 1 near the inlet end 5, whereby a liquid or a fluid can be conducted into the fibre housing 1. The fibre housing 1 is open at the outlet end 3, whereby the liquid or fluid can be discharged from the fibre housing 1. For the device of FIG. 1 there is no separate gas inlet, so in order to use this device for contacting a liquid with a gas, the gas must be introduced into or mixed with the liquid before the liquid mixed wit gas is entering the fluid or liquid inlets 6.

In the illustrated embodiment of FIG. 1, the fibre housing 1 is made of a flexible material such as softened PVC or PVC-flexible, and the side-wall of the fibre housing has a thickness of about 5 mm and the inner diameter of the fibre housing is about 50 mm, giving an outer diameter about 60 mm. The cross 4 is made of stainless steel and has a diameter of 2 mm. The fibres may for example be hollow fibres of Tynex® nylon (available from the DuPont Company) with an unfolded length of 600 mm and a diameter in about 0.15 mm. However, solid fibres may also be used. Thus, the bent or folded length of the fibres in the bundle 2 will be about or a little less than 300 mm. The length of the fibre housing will then be about or a little more than 300 mm. It should be noted that the fibre housing 1 may also be made of a rubber material such as EPDM-rubber.

When the fibres are in an uncompressed condition the interspaces between the fibres are defined by the arrangement of the fibres at the inlet end 5 and the arrangement of the fibres around the cross 4 at the outlet end 3. Due to the arrangement around the cross 4, the size of the interspaces and thereby the flow passages may vary slightly from the inlet end 5 to the outlet end 3. It is also within an embodiment of the present invention to have the two members of the cross 4 separated from each other with a distance around 20 mm.

When a gas-liquid mixture is passed through the flow passages of the fibres of the device of FIG. 1, bubbles or micro-bubbles containing the introduced gas may be generated within the liquid, and the dimension of these bubbles or micro-bubbles may be a function of the cross-sectional dimension of the flow passages provided by the interspaces. The dimension of these flow passages may again be a function of the diameter of the fibres and the packing density or close packing of the fibres. Thus, the process of contacting a liquid with a gas when passing the flow passages of the device of FIG. 1 may be controlled or regulated by the selection of types of fibres (hollow or solid), the diameter of the fibres, and the close packing of the fibres. Here, the close packing of the fibres may be controlled by a compression of the fibres in the radial direction.

Besides being used for contacting a liquid with a gas, the device of FIG. 1 may also be used for filtering a fluid or a liquid. The filtering process may be performed simultaneously with a liquid-gas contacting process. Also here, the minimum size of particles to be filtered from the fluid or liquid is a function of the diameter of the fibres and the packing or cross-sectional density of the fibres. Thus, the filtered particle size decreases with a decreasing fibre diameter. Although it is preferred to have a relatively high density of fibres it is important that the cross-sectional area of the flow passages is larger at a distance from the location of the compressed fibres than at said location in order to avoid clogging.

In order to compress the fibres of the device of FIG. 1, the flexible membrane surrounding the fibre bundle 2 may be compressed at a radial direction at a location along the housing 1. Hereby the total cross-sectional area of the interspaces between the fibres and thereby the cross-sectional area of the flow passages is reduced at said location with the cross-sectional areas of the flow-passages being gradually decreased towards this location. Thus, the cross-sectional area of the flow passages and thereby the contacting effect and/or filtering effect may be varied by varying the external pressure on the flexible membrane.

In order to compress the fibres of the fibre bundle 2, the filtering device of FIG. 1 comprises compressing means in the form of a clamp having two curved jaws 7a, 7b. Here the jaws 7a, 7b are made of stainless steel having a coating of softened PVC on the surfaces for contacting the flexible membrane of the fibre housing 1.

When the jaws 7a, 7b are pressed against the fibre housing 1, the fibres are compressed and the filtering device can be used for filtration of the fluid. When the fluid is conducted through the fibre housing the filtered particles will be deposited in the inlet side of the fibre housing 1 between the inlets 6 and the location 8 of the compressed fibres.

In order to obtain sufficient space for the deposited particles and in order to avoid an early clogging of the filtering device, the jaws 7a, 7b and thereby the location of compressing 8 are preferably arranged so that about ⅔ of the length of the fibre housing is on the inlet side of the jaws 7a, 7b and about ⅓ of the length of the fibre housing is on the outlet side of the jaws 7a, 7b. For the device of FIG. 1 the width of the jaws 7a, 7b is about 25 mm. The contacting surfaces of the jaws 7a, 7b are formed so that each surface covers about ⅓ of the outer diameter or circumference of the uncompressed fibre housing 1.

The jaws or blocks 7a, 7b of the compressing means may be controlled manually or by hydraulic means. When using hydraulic means the pressure of the compressing means may be controlled electronically by use of for example a computer. For the device of FIG. 1 processes have been carried out with a pressure around two tons on the compressing means 7a, 7b, whereby the fibre bundle 2 is compressed.

In order to support or hold the fibre housing 1 of FIG. 1 a holding member 9 is provided. The holding member has the form of a tube with a fluid or liquid inlet end and a fluid or liquid outlet end and with two oppositely arranged openings 10a, 10b allowing the compressing means 7a, 7b to compress the flexible membrane of the fibre housing 2. The holding member or pipe 9 has a first inner collar 11 at the inlet end and a second inner collar 12 at the outlet end, with a first o-sealing ring 13 being arranged around the fibre housing 1 at the inlet end 5 and being in sealing engagement with the first inner collar 11, and with a second o-sealing ring 14 being arranged around the fibre housing 1 at the outlet end 3 and being in sealing engagement with the second inner collar 12. In the embodiment shown in FIG. 1 there is also formed an outer collar 15 at the inlet end 5 of the fibre housing 1, whereby the first o-sealing ring 13 is placed between the outer collar 15 and the first inner collar 11. The holding member or pipe 9 further has an inlet flange 16 arranged at the fluid or liquid inlet end and an outlet flange 17 arranged at the fluid outlet end.

The flanges 16,17 are secured to the holding member 9 with bolts 18 and corresponding nuts 19.

The inlet flange 16 is dimensioned to fit a fluid inlet pipe, and the outlet flange 17 is dimensioned to fit a fluid outlet pipe.

For the device of FIG. 1, the inlet and outlet pipes are ¾ inches pipes, and the holding member or pipe 9 is made of stainless steel with an outer diameter of 100 mm and a length around 360 mm.

When using softened PVC for the fibre housing 1, the stiffness of the housing 1 will be large enough to ensure a sealing engagement between the inner collar 12 and the o-sealing ring 14. This sealing engagement is further amplified by the pressure of the fluid inside the fibre housing 1. However, if a rubber membrane is used for the fibre housing 1 it may be necessary to reinforce the outlet end 3 of the fibre housing 1.

It should be noted that a device similar to the device of FIG. 1 but without the compression means 7a, 7b may be used for contacting a liquid with a gas according to embodiments of the present invention. Here, the cross-sectional area of the flow passages may be a function of the types of fibres and the fibre diameter and the density of the fibres within the fibre housing 1, but due to the lack of compression means the cross-sectional area of the flow passages can not be changed without changing the fibres, the number of fibres or the cross-sectional area of the fibre housing 1.

Figure 2:
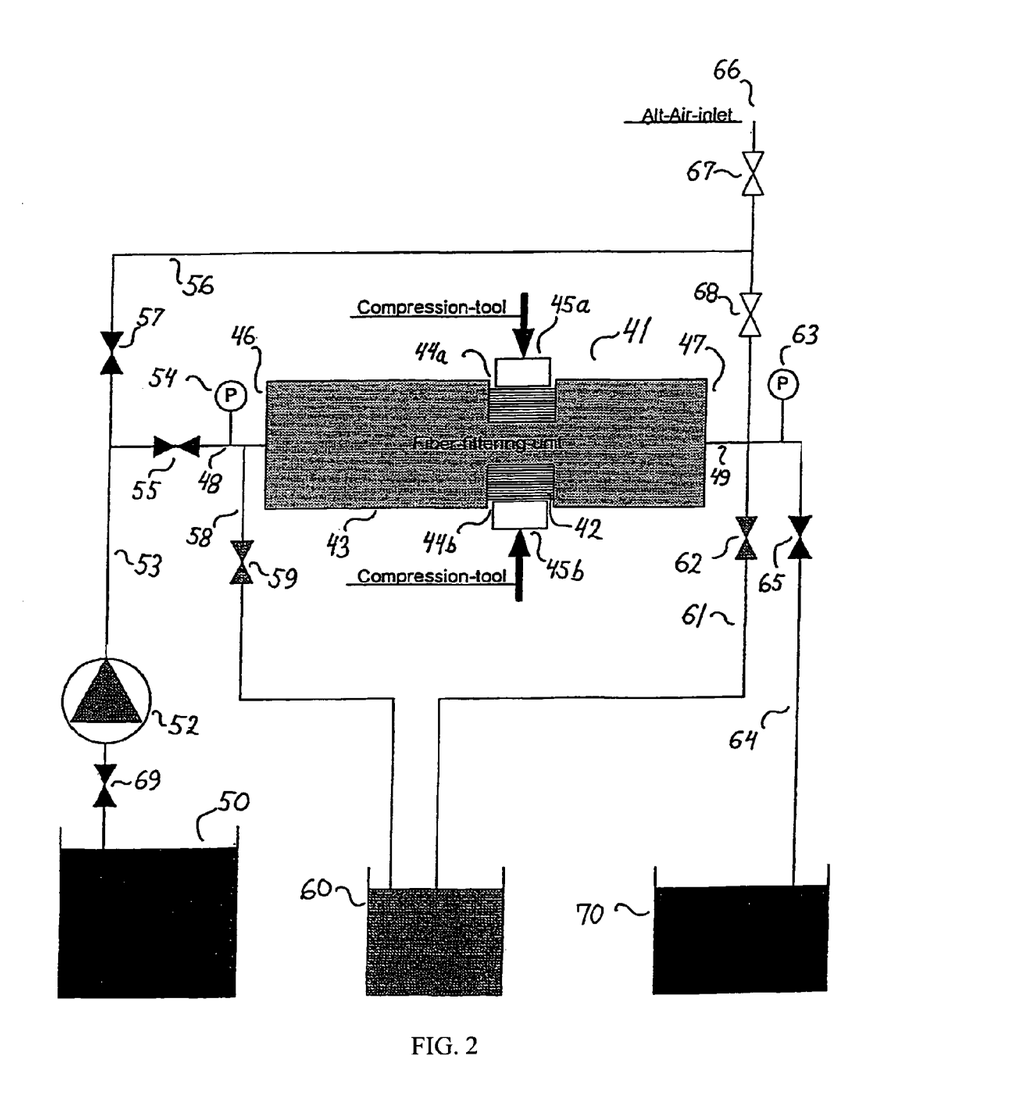
FIG. 2 is a block diagram showing a first embodiment of a system for contacting a liquid with a gas in accordance with an embodiment of the present invention.

It should be understood that a major advantage of a device according to the present invention is the possibility of flushing the fibres when the pressure on the fibres is released. This is especially an advantage when using the device for filtration. The flushing process may be either a forward flushing or a backward flushing process. This is illustrated in FIG. 2, which is a block diagram showing a system using a contacting or filtering device according to the present invention. The device may preferably be the device shown in FIG. 1.

The system of FIG. 2 comprises a device 41 according to the device of FIG. 1. The device 41 has a fibre housing 42 within a holding member 43 having openings 44a, 44b for compressing means 45a, 45b, which compressing means can create a pressure on a flexible membrane of the fibre housing 42. The filtering device 41 further has a liquid or fluid inlet end 46 and a liquid or fluid outlet end 47 for connecting to liquid or fluid inlet and outlet pipes 48, 49, respectively.

The system of FIG. 2 further comprises a container for unfiltered liquid or fluid 50, with a pipe 51, which via a liquid valve 69 is connected to the inlet side of a pump 52 for providing a predetermined fluid or liquid pressure. According to a preferred embodiment a gas-inlet valve is connected between the liquid valve 69 and the inlet side of the pump 52. When the liquid valve 69 is open, the gas-inlet valve is open and the pump 52 is on, a mixture of liquid and gas is provided at a certain pressure at the outlet side of the pump 52.

From the outlet side of the pump 52 a pipe 53 is leading the fluid, liquid or mixture of gas and liquid through a valve 55 to the fluid or liquid inlet pipe 48 having a pressure gauge 54. Before the valve 55 a pipe 56 is connected to the pipe 53 via a valve 57, with the other end of the pipe 56 being connected to the fluid or liquid outlet pipe 49. The liquid or fluid inlet pipe 48 is connected to a pipe 58, which via a valve 59 leads to a container 60 for containing filtered particles or deposit being removed from the fibre housing 42 during a flushing process. The liquid or fluid outlet pipe 49 is further connected to a pipe 61, which via a valve 62 leads to the deposit container 60. The liquid or fluid outlet pipe 49 also has a pressure gauge 63, and after the connections to pipes 56 and 61, the liquid or fluid outlet pipe 49 is connected to a pipe 64, which via a valve 65 conducts the treated and/or filtered liquid or fluid to a container for treated and/or filtered liquid or fluid 70.

In FIG. 2 is also shown an inlet 66 which is connected to the pipe 56 via a valve 67. Furthermore a valve 68 is inserted in the pipe 56 before the connection to the liquid, or fluid outlet pipe 49. The inlet 66 may be used for injecting or conducting a liquid, air or a gas into the system to be used for a flushing process. The liquid, air or gas should have a pressure being high enough to flush the system.

When the system of FIG. 2 is operating in a mode where the fibres are compressed, the compression means 45a, 45b is providing a predetermined pressure on the fibres within the fibre housing 42, the valves 69, 55, 65 and the gas-inlet valve are open, the valves 57, 59, 62, 67 and 68 are closed, and the pump 52 is providing a predetermined fluid or liquid inlet pressure. This pressure may for example be up to 20 bar, such as up to 10 bar, such as in the range of 5–10 bar. When the process has been going on for some time, the fibre within the fibre housing 42 may need to be flushed.

If a forward flushing using fluid is wanted, the pump 52 may be turned off, the valves 69, 55, 65 and the gas-inlet valve are closed while maintaining the valves 57, 59, 62, 67 and 68 in the closed position, the compression means 45a, 45b is released, then the valves 62, 69 and 55 are opened and the pump 52 is turned on again. This will conduct unfiltered and/or untreated fluid through the uncompressed fibres of the fibre housing 42 and through the pipe 61 to the deposit container 60.

If a backward flushing using fluid is wanted, the pump 52 may be turned off, the valves 69, 55, 65 and the gas-inlet valve are closed while maintaining the valves 57, 59, 62, 67 and 68 in the closed position, the compression means 45a, 45b is released, then the valves 69, 57, 68 and 59 are opened and the pump 52 is turned on again. This will conduct unfiltered fluid through the pipe 56, backwards through the uncompressed fibres of the fibre housing 42, and through the pipe 58 to the deposit container 60.

If a forward flushing using inlet 66 is wanted, the pump 52 may be turned off, the valves 69, 55, 65 and the gas-inlet valve are closed while maintaining the valves 57, 59, 62, 67 and 68 in the closed position, the compression means 45a, 45b is released, then the valves 62, 67, 57 and 55 are opened. This will conduct liquid, air or gas from inlet 66 through the uncompressed fibres of the fibre housing 42 and through the pipe 61 to the deposit container 60.

If a backward flushing using inlet 66 is wanted, the pump 52 may be turned off, the valves 69, 55, 65 and the gas-inlet valve are closed while maintaining the valves 57, 59, 62, 67 and 68 in the closed position, the compression means 45a, 45b is released, then the valves 67, 68 and 59 are opened. This will conduct liquid, air or gas from inlet 66 through the pipe 56, backwards through the uncompressed fibres of the fibre housing 42, and through the pipe 58 to the deposit container 60.

Usually, a backward flushing process is used in order to avoid any further contamination of the system.

It should be understood that it is also within the present invention to provide a system for contacting a liquid with a gas or for filtering a liquid or fluid, which system is automatically operated by a computer, such as a programmable logic controller, PLC. Here, the computer may be programmed to control the compressing and the release of the pressure means by use of for example hydraulic means. Predetermined pressures and time intervals may be programmed into the computer in order to control such a process. The computer may further be programmed to control the fluid pump 52 and the valves 55, 57, 59, 62, 65, 67, 68 and the gas-inlet valve to be active and non-active at predetermined time intervals.

Figure 3:
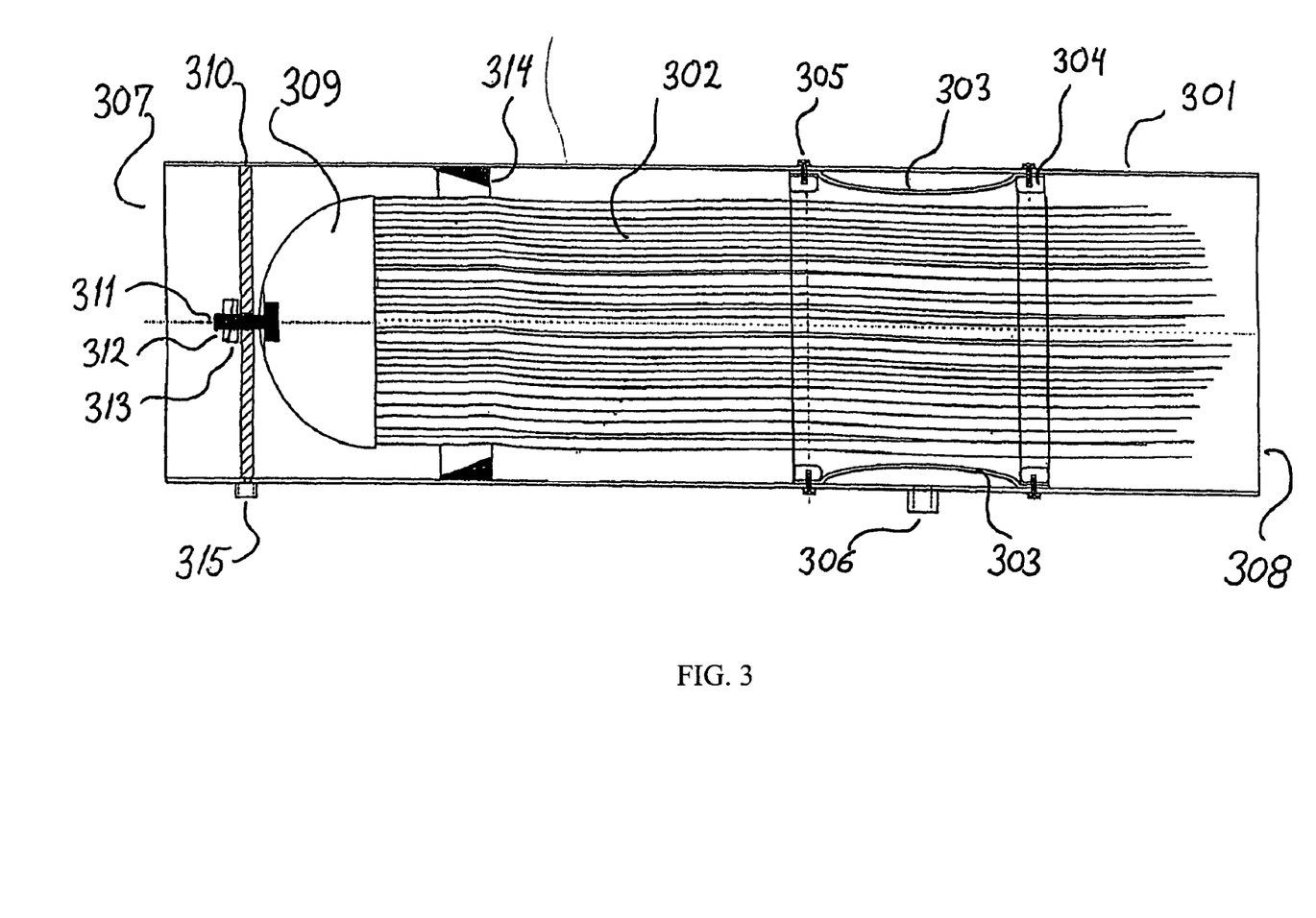
FIG. 3 is a longitudinal section view of a second embodiment of a device used for contacting a liquid with a gas in accordance with the present invention.

FIG. 3 is a longitudinal section view of a second embodiment of a device used for contacting a liquid with a gas in accordance with the present invention. The device of FIG. 3 comprises a fibre housing 301 having the form of a tube. Here, the fibre housing 301 is made of a watertight material, which is solid in all the housing length and surrounding a bundle of fibres 302. The bundle of fibres 302 comprises a plurality of fibres extending longitudinally in the fibre housing 301. For this embodiment of the invention, compression means 303 in the form of a compression membrane, liner or bellow is arranged at a location inside the fibre housing 301 and surrounding the fibres 302. The compression means 303 is made of a flexible material and sealingly connected to the inner wall of the housing 301 by mounting and seal rings 304 and mounting bolts 305. A hydraulic inlet/outlet opening 306 is arranged in the housing 303 for providing and/or controlling a hydraulic pressure whereby the compression means 303 may be compressed against the bundle of fibres 302.

In the illustrated embodiment the fibre housing 301 has an inlet end 307 and an outlet end 308, and the fibres 302 have free fibre ends at the outlet end 308. At the inlet end 307 the fibres are secured to a fibre-head 309, and it is preferred that the fibres 302 are glued to the fibre-head 309 by means of epoxy. The bundle of fibres 302 should be substantially equally spaced when arranged in the epoxy of the fibre-head 309 in order to obtain a number of substantially equally sized interspaces defining flow passages. One or more liquid or fluid inlets may be arranged at or around the inlet end 307 of the fibre housing 301, whereby a liquid or a fluid can be conducted into the fibre housing 301. The fibre housing 301 has one or more liquid or fluid outlets at the outlet end 308, whereby the liquid or fluid can be discharged from the fibre housing 301. The fibre-head 309 is fastened to a fibre-head mounting 310, which is secured to the fibre housing 301, and the liquid or fluid may pass from the inlet(s) through the mounting 310, along the fibre-head 309, and then enter into the bundle of fibres 302 along the outer side of the bundle 302. When a liquid is introduced into the bundle of fibres 302, the fibres may be pressed against the fibre housing 301 and the compression means 303, whereby the liquid will have to pass through interspaces being provided between the fibres before leaving the fibre housing 301 through the liquid outlet(s).

The fibre-head 309 may be secured to the mounting 310 via a head-bolt 311 having a flush-nut 312 resting on a flush-ring 313. A free-space is provided around the head-bolt 311 within the mounting 310, and a flush-space is provided between the mounting 310 and the fibre-head 309. It is preferred that a ring 314 for providing a turbulent liquid flow, such as for example during a flushing process, is arranged at the inner wall of the housing 301.

For the device of FIG. 3 a gas inlet 315 may be provided at the inlet end 307. Here, the gas inlet 315 may be part of the mounting 310, whereby the gas may be introduced to the liquid at the free-space in front of the fibre-head 309. However, in a preferred embodiment, there is no use of a separate gas inlet, and the gas is introduced into or mixed with the liquid before the liquid mixed with gas is entering the fluid or liquid inlets.

It is preferred that the flush-ring 313 has a variable thickness or height and that the flush-nut 312 is dimensioned to fit to the variable height of the flush-ring. Thus, if the fibre head 309 is turned or twisted during for example a flushing process, the fibre-head 309 may be moved to and fro in the direction against the mounting 310. The fibre-head 309 may be twisted due to a turbulent liquid flow, which may be provided by the ring 314.

For the illustrated embodiment of FIG. 3, the fibre housing 301 and the mounting 310 may be made of stainless steel while the compression means 303 may be made of a flexible material such as softened PVC or PVC-flexible or rubber. The inner diameter of the fibre housing may in a preferred embodiment be about 100 mm, and the diameter of the fibre-head 309 and the bundle of fibres 302 may be around 76 mm. In one embodiment the fibres are hollow fibres of nylon with a length around 400 mm and a fibre diameter of about 6 mm. The total length of the fibre housing 301 may be 500 mm. Solid fibres may also be used, and in one embodiment solid fibres with a diameter of 2.5 mm are used.

When a gas-liquid mixture is passed through the flow passages of the fibres of the device of FIG. 3, bubbles or micro-bubbles containing the introduced gas may be generated within the liquid, see also the above discussion in connection with FIG. 1, and the dimension of these bubbles or micro-bubbles may be a function of the cross-sectional dimension of the flow passages provided by the interspaces. When using hollow fibres of a diameter of 6 mm, it is preferred in one embodiment to use a hydraulic pressure of about 5–10 bar on the compression liner in order to obtain a very close packing of the fibres resulting in flow passages which may have a cross-sectional dimension in the range of 0.4 mm. The mixture of liquid and gas may be introduced at the inlet end of the fibre housing 301 at a pressure in the range of 4–6 bar.

Besides being used for contacting a liquid with a gas, the device of FIG. 3 may also be used for filtering a fluid or a liquid. The filtering process may be performed simultaneously with a liquid-gas contacting process, see the above discussion in connection with FIG. 1.

It should be noted that a device similar to the device of FIG. 3 but without the compression liner 303 may be used for contacting a liquid with a gas according to embodiments of the present invention. Here, the cross-sectional area of the flow passages may be a function of the types of fibres and the fibre diameter and the density of the fibres within the fibre housing 301, but due to the lack of compression means the cross-sectional area of the flow passages can not be changed without changing the fibres, the number of fibres or the cross-sectional area of the fibre housing 301.

Figure 4:
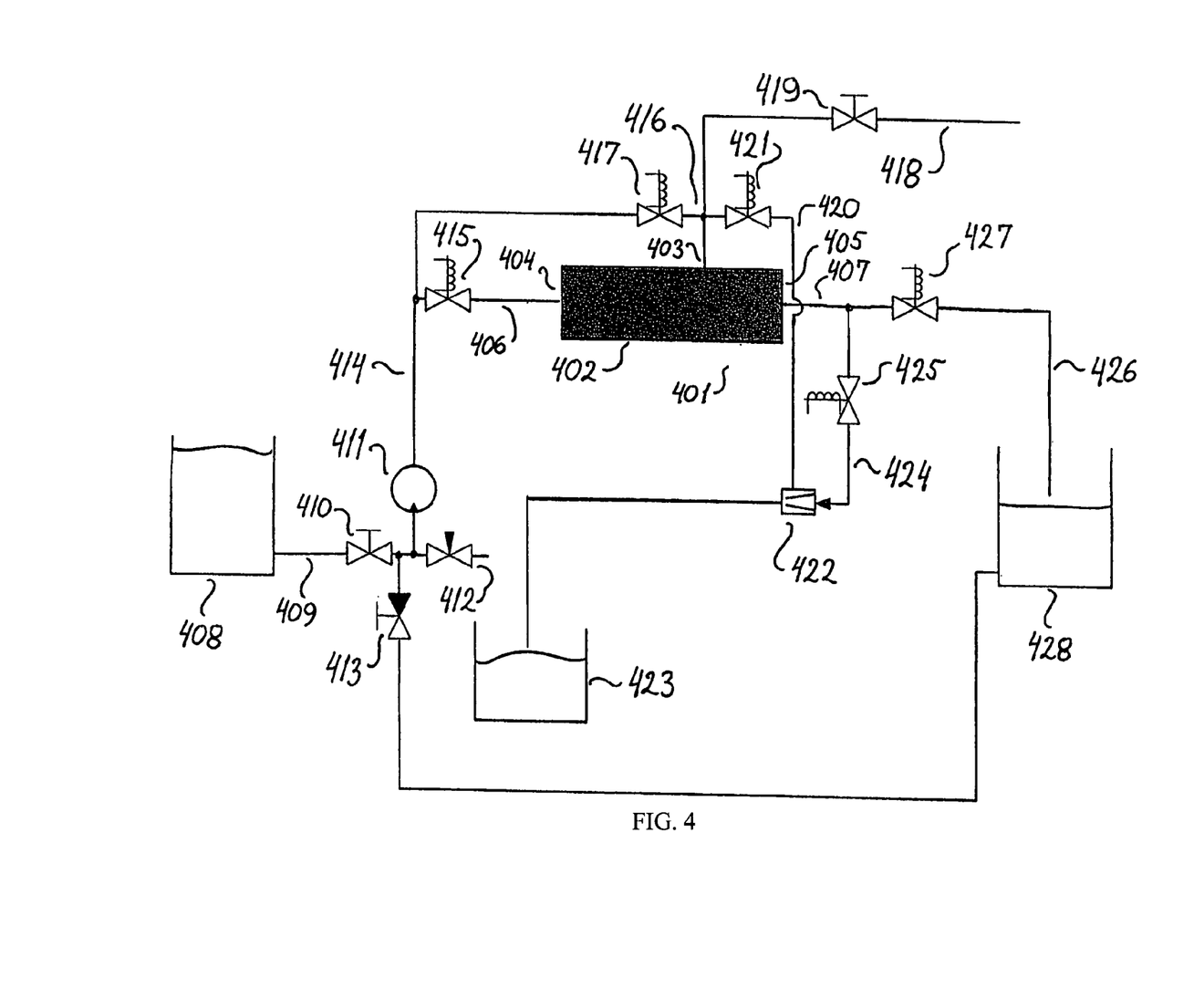
FIG. 4 is a block diagram showing a second embodiment of a system for contacting a liquid with a gas in accordance with an embodiment of the present invention.

It should be understood that a major advantage of a device according to the present invention is the possibility of flushing the fibres when the pressure on the fibres is released. This is especially an advantage when using the device for filtration. The flushing process may be either a forward flushing or a backward flushing process. A system capable of performing a forward flushing process is illustrated in FIG. 4, which is a block diagram showing a system using a contacting or filtering device according to the present invention. Thus, the system of FIG. 4 may be used for contacting a liquid with a gas in accordance with one or more embodiments of the present invention, but the system may also be used for a filtering process.

The system of FIG. 4 comprises a device 401, which is a device according to one or more embodiments of the device of FIG. 3. The device 401 has a fibre housing 402 having a hydraulic inlet/outlet opening 403 leading to compressing means inside the housing for compressing the fibre bundle inside the fibre housing 402. A fluid or gas may be introduced at a certain pressure via the opening 403 in order to compress the fibres. The device 401 further has a liquid or fluid inlet end 404 and a liquid or fluid outlet end 405 for connecting to liquid or fluid inlet and outlet pipes 406, 407, respectively.

The system of FIG. 4 further comprises a container for unfiltered liquid or fluid 408, with a pipe 409, which via a liquid valve 410 is connected to the inlet side of a pump 411 for providing a predetermined fluid or liquid pressure. A gas-inlet valve 412 is also connected at the inlet side of the pump 411. Furthermore, at re-circulation valve 413 is connected at the inlet side of the pump 411. When the liquid valve 410 is open, the gas-inlet valve 412 is open, the re-circulation valve 413 is closed and the pump 411 is on, a mixture of liquid and gas is provided at a certain pressure at the outlet side of the pump 411.

From the outlet side of the pump 411 a pipe 414 is leading the fluid, liquid or mixture of gas and liquid through a valve 415 to the fluid or liquid inlet pipe 406. Before the valve 415 a pipe 416 is connected to the pipe 414 via a compression valve 417, with the output of the valve 417 being connected to the opening 403. The opening 403 is also connected to an external control pipe 418 via an external control valve 419 and to a pipe 420 via a decompression valve 421. The pipe 420 is connected to an injector 422.

The output of the injector 422 leads to a container 423 for containing filtered particles or deposit being removed from the fibre housing 402 during a flushing process. The liquid or fluid outlet pipe 407 is further connected to the injector 422 via a pipe 424 and a forward flush valve 425. The liquid or fluid outlet pipe 407 is connected to a pipe 426, which via a valve 427 conducts the treated and/or filtered liquid or fluid to a container 428 for treated and/or filtered liquid or fluid.

The compression of the fibres may be controlled externally by adjusting the hydraulic pressure via the external control pipe and valve 419. When operating in this mode, the valves 417 and 421 are closed. When decompressing the compressing means, the decompressing may take place via the valve 419 or by opening the decompressing valve 421. However, it is preferred that the valve 419 is closed and that the compression pressure is controlled via the compression valve 417. Here, valves 415, 412, 413, 419 and 421 are closed while valve 410 and 417 are open and untreated fluid or liquid is pumped by the pump 411 via pipe 416 into the compression means via the opening 403. When a desired pressure has been obtained, valve 417 is closed, and the system may be used for normal operation.

During normal operation, valves 413, 417, 419, 421 and 424 are closed, while valves 410, 412, 415 and 427 are open. Here, valve 412 may be closed if the fluid or liquid is to be filtered or treated without the gas contact. The pump 411 is providing a predetermined fluid or liquid inlet pressure. This pressure may for example be up to 20 bar, such as up to 10 bar, such as in the range of 5–10 bar, or such as in the range of 4–6 bar. When the process has been going on for some time, the fibres within the fibre housing 402 may need to be flushed.

If a forward flushing using fluid is wanted, the pump 411 may be turned off, the valves 410, 412, 415 and 427 are closed, and valves 413, 417 and 419 are maintained closed, the decompression valve 421 and the forward flush valve 425 are opened, then the valves 410, 415 are opened and the pump 411 is turned on again. This will conduct unfiltered and/or untreated fluid forwards through the fibres while at the same time decompressing the fibres by having the injector 422 removing the compression fluid or liquid via the decompression valve 421. The flushing and compression liquid or fluid is conducted via the injector 422 to the waste or deposit container 423.

It should be understood that it is also within the present invention to provide a system according to FIG. 4 for contacting a liquid with a gas or for filtering a liquid or fluid, which system is automatically operated by a computer, such as a programmable logic controller, PLC. Here, the computer may be programmed to control the pump 411 and the valves to be active and non-active at predetermined time intervals.

It should be understood that devices and systems according to aspects of the present invention can be used for a plurality of different processes. For many processes the gas mixed with the liquid may be atmospheric air, which is taken in at atmospheric pressure via a gas-inlet arranged before the pump 52, 411.

One example of a process according to the present invention is a separation process in which oils or fats are separated from an aqueous solution. Here, as an example, atmospheric air is used and mixed with the solution before entering the liquid and gas contacting device of the invention, which may a device according to FIG. 3. Here, the inner diameter of the fibre housing is about 100 mm, and the diameter of the fibre-head 309 and the bundle of fibres 302 is around 76 mm. The fibres are hollow fibres of nylon with a length around 400 mm and a fibre diameter of about 6 mm. A compression pressure of 10 bar is used in order to obtain a close packing of the fibres and obtain fibre interspaces, which may be in the range of 0.4 mm, whereby very fine micro-bubbles, which may be in the range of 0.4 mm, may be formed. The mixed solution is introduced at a pressure around 5 bar. The dimensions of the fibre housing and the fibre bundle are selected so that for this inlet pressure, a fluid flow of about 1 cubic meter per hour is obtained. A separation process of oils or fats from an aqueous solution may also be performed for this embodiment of the device without using any compression of the compression means. Here, the interspaces between the fibres will be much wider and the formed bubbles will have a much larger diameter, and a fluid flow through the device in the range of 9.5 cubic metres per hour can be obtained for a fluid inlet pressure of about 4 bar.

Thus, separation processes may be performed for different compression of the fibres, which results in different throughputs of the solution to be treated. However, for some purposes it has been found that a compression of the compression means against the fibres with a hydraulic pressure in the range of 5–10 bar may provide a good solution.

The devices and methods of the present invention may also be used for a number of other processes besides separation processes. Thus, according to the present invention effective methods may be provided for reacting a gas with a liquid in which the parameters of the process are controlled so that the introduced gas is wholly or at least partly absorbed in the liquid.

According to the methods of the present invention there may also be provided effective methods for drive off of gasses from a solution such as for example ammonia, hydrogen sulphide and solvents. Here, air may be introduced into the solution and the gas be driven off from the solution by the generated bubbles.

It should be understood that methods of sterilization of a liquid or a solution may also be obtained using the present invention. Here, a sterilizing gas such as ozone may be introduced in order to react with the liquid or solution. The ozone may be introduced via a separate gas-inlet directly at the inlet end of the fibre housing with a pressure which is higher than the inlet pressure of the liquid or solution. The inlet pressure of the ozone may be in the range of 0.5–2 bar higher than the inlet pressure of the liquid, which may be in the range of 4–6 bar.

By using an oxygen containing gas as the gas, and waste water as the liquid, the methods of the present invention may provide an effective process for reducing the COD-number (Chemical Oxygen Demand) of the waste water, as an effective reaction between the oxygen of the gas and the waste water can be obtained through the formation of the bubbles or micro-bubbles.

While the invention has been particularly shown and described with reference to particular embodiments, it will be understood by those skilled in the art that various changes in form and details may be made therein without departing from the spirit and scope of the invention, and it is intended that such changes come within the scope of the following claims.

The invention claimed is:

1. A device for contacting a liquid with a gas, said device comprising:
    at least one gas inlet for introducing the gas into the liquid,
    a fibre housing having at least one liquid inlet arranged in an inlet end of the fibre housing and at least one liquid outlet,
    wherein said fibre housing surrounds and defines an outer bound for a plurality of fibres extending longitudinally in the fibre housing, longitudinally extending interspaces being provided between the fibres thereby defining a plurality of flow passages for the liquid and gas, and
    wherein at least part of the gas inlet(s) are arranged so that at least part of the gas can be introduced into the liquid at the inlet end of the fibre housing or before the liquid enters the inlet end of the fibre housing via said liquid inlet(s), whereby a flow of gas and liquid can be obtained from the inlet end to the outlet end via the flow passages provided by said interspaces, said interspaces thereby providing a contact between the liquid and the gas wherein the diameter of the fibres and the dimension of the flow passages are selected so as to generate micro-bubbles containing the introduced gas within the liquid, the dimension of said micro-bubbles being a function of the diameter or cross-sectional dimensions of the fibres and/or the cross-sectional dimensions of the flow passages provided by the interspaces.

2. A device according to claim 1, said device further comprising at least one gas outlet.

3. A device according to claim 1, said device further comprising a gas liquid separator.

4. A device according to claim 3, wherein the gas liquid separator is connected to the at least one gas outlet.

5. A device according to claim 2, wherein the at least one gas, outlet is part of or connected to the fibre housing.

6. A device according to claim 1, wherein the at least one liquid outlet is arranged in an outlet end of the fibre housing.

7. A device according to claim 6, wherein the longitudinally extending interspaces between the fibres are at least partly extending in a direction from the inlet end to the outlet end of the fibre housing.

8. A device for contacting a liquid with a gas, said device comprising:
    at least one gas inlet for introducing the gas into the liquid,
    a fibre housing having at least one liquid inlet and at least one liquid outlet,
    wherein said fibre housing surrounds and defines an outer bound for a plurality of fibres extending longitudinally in the fibre housing, longitudinally extending interspaces being provided between the fibres thereby defining a plurality of flow passages for the liquid and gas, and
    wherein at least part of said fibre housing is formed of a flexible membrane surrounding the fibres, and compressing means is provided for creating a pressure on an outer surface of the flexible membrane thereby compressing the fibres in a radial direction at at least one location along the length of the fibres to thereby enable variation in cross-sectional dimension of the flow passages and/or the fibres so as to controllably generate bubbles or micro-bubbles containing the introduced gas in the liquid.

9. A device according to claim 8, said device further comprising at least one gas outlet.

10. A device according to claim 8, said device further comprising a gas liquid separator.

11. A device according to claim 10, wherein the gas liquid separator is connected to the at least one gas outlet.

12. A device according to claim 9, wherein the at least one gas outlet is part of or connected to the fibre housing.

13. A device according to claim 8, wherein the at least one liquid inlet is arranged in an inlet end of the fibre housing.

14. A device according to claim 8, wherein the at least one liquid outlet is arranged in an outlet end of the fibre housing.

15. A device according to claim 14, wherein the longitudinally extending interspaces between the fibres are at least partly extending in a direction from the inlet end to the outlet end of the fibre housing.

16. A system for contacting a liquid with a gas, said system comprising:
 a contacting device according to claim 1, and
 means for passing a liquid and a gas through the plurality of flow passages of the fibres.

17. A system according to claim 16, said system further comprising means for maintaining the fibres in a compressed condition while passing the liquid and the gas through the flow passages of the compressed fibres.

18. A system according to claim 17, said system further comprising:
 means for releasing the pressure on the outer surface of the flexible membrane thereby leaving the fibres in an uncompressed condition,
 means for passing a liquid and/or a gas through the uncompressed fibres in a direction from the inlet towards the outlet or in an opposite direction, so as to forward flush or backward flush the device.

19. A method for contacting a liquid with a gas in a fibre housing having an inlet end and an outlet end, said fibre housing surrounding and defining an outer bound for a plurality of fibres extending longitudinally in the fibre housing, longitudinally extending interspaces being provided between the fibres thereby defining a plurality of flow passages between the inlet end and the outlet end, said method comprising:
 introducing a liquid and a gas at the inlet end of the fibre housing, and
 passing the liquid and the gas from the inlet end to the outlet end via said flow passages provided by the interspaces; and
 generating micro-bubbles containing the introduced gas within the liquid, the dimension of said micro-bubbles being a function of the diameter or cross-sectional dimensions of the fibres and/or the cross-sectional dimension of the flow passages provided by the interspaces.

20. A method according to claim 19, wherein the longitudinally, extending interspaces between the fibres are at least partly extending in a direction from the inlet end to the outlet end of the fibre housing.

21. A method according to claim 19, wherein the liquid and the gas are mixed before being introduced at the inlet end of the fibre housing.

22. A method according to claim 21, wherein a pressure in the range of 2–7 bar, such as 3 bar, such as about 4 bar, such as about 5 bar, or such as about 6 bar, is provided for the liquid-air mixture at the inlet end of the fibre housing.

23. A method according to claim 19, wherein the gas is introduced at the inlet end via one or more gas inlets.

24. A method according to claim 19, wherein the liquid is introduced at the inlet end via one or more liquid inlets.

25. A method according to claim 19, wherein the plurality of fibres are closely packed in a radial direction at least one location along the length of the fibres within said fibre housing.

26. A method according to claim 19, said method further comprising the steps of compressing the fibres in a radial direction at a location along the length of the fibres, so as to reduce the cross sectional area of the flow passages, and maintaining the pressure on the fibres while passing the liquid and the gas to be contacted through said flow passages.

27. A method according to claim 19, wherein the diameter of the fibres and the dimension of the flow passages are selected so that the generated micro-bubbles have a cross-sectional dimension, which is at most 1 mm, such as in the range of 0.1–1 mm, such as in the range of 0.2–0.6 mm, such as about 0.4 mm.

28. A device according to claim 1, wherein the diameter of the fibres and the dimension of the flow passages are selected so that the generated micro-bubbles have a cross-sectional dimension, which is at most 1 mm, such as in the range of 0.1–1 mm, such as in the range of 0.2–0.6 mm, such as about 0.4 mm.

29. A device according to claim 8, wherein the diameter of the fibres and the dimension of the flow passages are selected so that the generated micro-bubbles have a cross-sectional dimension, which is at most 1 mm, such as in the range of 0.1–1 mm, such as in the range of 0.2–0.6 mm, such as about 0.4 mm.

30. A method according to claim 29, wherein the fibres are formed from a material selected from the group consisting of polyester, nylon, glass materials and stone materials.

31. A device according to claim 1, wherein the fibres are formed from a material selected from the group consisting of polyester, nylon, glass materials and stone materials.

32. A device according to claim 8, wherein the fibres are formed from a material selected from the group consisting of polyester, nylon, glass materials and stone materials.

* * * * *